(12) United States Patent
Podemsky

(10) Patent No.: US 11,863,564 B1
(45) Date of Patent: Jan. 2, 2024

(54) SYSTEMS AND METHODS FOR MULTI-FACTOR AUTHENTICATION BY A COMMERCE PLATFORM USING A CLOUD SERVICES PROVIDER

(71) Applicant: Stripe, Inc., San Francisco, CA (US)

(72) Inventor: Yoav Podemsky, San Francisco, CA (US)

(73) Assignee: STRIPE, INC., San Francisco, CA (US)

(*) Notice: Subject to any disclaimer, the term of this patent is extended or adjusted under 35 U.S.C. 154(b) by 659 days.

(21) Appl. No.: 16/745,002

(22) Filed: Jan. 16, 2020

(51) Int. Cl.
*H04L 9/40* (2022.01)
*G06Q 20/38* (2012.01)
*G06Q 20/40* (2012.01)

(52) U.S. Cl.
CPC ....... *H04L 63/105* (2013.01); *G06Q 20/3823* (2013.01); *G06Q 20/3829* (2013.01); *G06Q 20/401* (2013.01); *H04L 63/06* (2013.01); *G06Q 2220/00* (2013.01); *H04L 2463/082* (2013.01)

(58) Field of Classification Search
CPC ............. H04L 63/0263; H04L 12/2898; H04L 41/0893; H04L 41/12; H04L 43/0876; H04L 63/105; H04L 63/06; H04L 2463/082; G06Q 20/409; G06Q 20/24; G06Q 20/385; G06Q 20/403; G06Q 20/3823; G06Q 20/3829; G06Q 20/401; G06Q 2220/00
See application file for complete search history.

(56) References Cited

U.S. PATENT DOCUMENTS

| | | | | |
|---|---|---|---|---|
| 9,779,405 B1* | 10/2017 | Krausz | ............... | H04W 12/041 |
| 10,521,799 B1* | 12/2019 | Walters | ............... | G06Q 20/385 |
| 2008/0189793 A1* | 8/2008 | Kirkup | .................... | G06F 21/53 |
| | | | | 726/27 |
| 2013/0179249 A1* | 7/2013 | Easterly | .............. | G06Q 20/387 |
| | | | | 705/14.34 |
| 2015/0302409 A1* | 10/2015 | Malek | ................. | G06Q 20/405 |
| | | | | 705/44 |
| 2017/0185999 A1* | 6/2017 | Al-Aali | ............... | H04L 12/2859 |

(Continued)

*Primary Examiner* — Abu S Sholeman
(74) *Attorney, Agent, or Firm* — Womble Bond Dickinson (US) LLP

(57) ABSTRACT

A method and apparatus for performing multi-factor authentication of a merchant system by a commerce platform are described. The method may include authenticating the commerce platform to a cloud services provider, the cloud services provider providing a private communications network for use by the commerce platform and the merchant system. The method may also include receiving, by the commerce platform, an authentication request from the merchant system, wherein the request received from the merchant system originates from the private communications network provided by the cloud services provider, and wherein the authentication request uses an encryption key. Furthermore, the method may include determining, by the commerce platform, validity of the encryption key used in the authentication request for the merchant system, and in response to origination of the authentication request occurring from within the private communications network and determining validity of the API key, authenticating the merchant system as an authorized system for performing an operation requested by the authentication request using the commerce platform.

20 Claims, 5 Drawing Sheets

(56) References Cited

U.S. PATENT DOCUMENTS

| | | | |
|---|---|---|---|
| 2019/0036878 A1* | 1/2019 | Morrison | G06F 16/9566 |
| 2019/0132303 A1* | 5/2019 | Kurian | H04L 63/08 |
| 2019/0332691 A1* | 10/2019 | Beadles | G06Q 20/3829 |
| 2020/0258061 A1* | 8/2020 | Beadles | H04L 63/102 |
| 2021/0400081 A1* | 12/2021 | van der Mandele | H04L 63/1416 |

* cited by examiner

SYSTEMS AND METHODS FOR MULTI-FACTOR AUTHENTICATION BY A COMMERCE PLATFORM USING A CLOUD SERVICES PROVIDER

BACKGROUND

Merchants, such as grocers, car services, dry cleaning services, etc., provide their products and services to consumers. Such merchants often employ agents to deliver their products and/or provide the actual services. For example, a person acting on the merchant's behalf will drive a consumer in their own car, deliver food ordered through a merchant website, pick up and/or drop off clothes dry cleaned by the merchant, etc.

These merchants, although providing a system for supplying products and/or services to consumers through their agents, often do not perform the financial processing associated with the merchant transactions. Instead, merchants utilize commerce systems to process financial transactions for the products and/or services provided to consumers. This processing may include running credit cards, crediting a merchant account for the transaction, crediting agents responsible for the transactions, debiting a commerce system fee for processing the transaction on behalf of the merchant, as well as performing other commerce related transactions for the merchant and/or agent such as providing payouts for products/services rendered on behalf of a merchant.

One significant problem with the above described process of performing transactions for a merchant includes verifying the identity of the merchant system. That is, since financial and/or other sensitive consumer information may be handled by the merchant, merchant accounts relating to the running of transactions configured, money transferred from merchant accounts to third party systems (e.g., banks or other financial institutions specified by the merchant), it is very important that the identity of the merchant system seeking to perform such actions be established and trusted.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
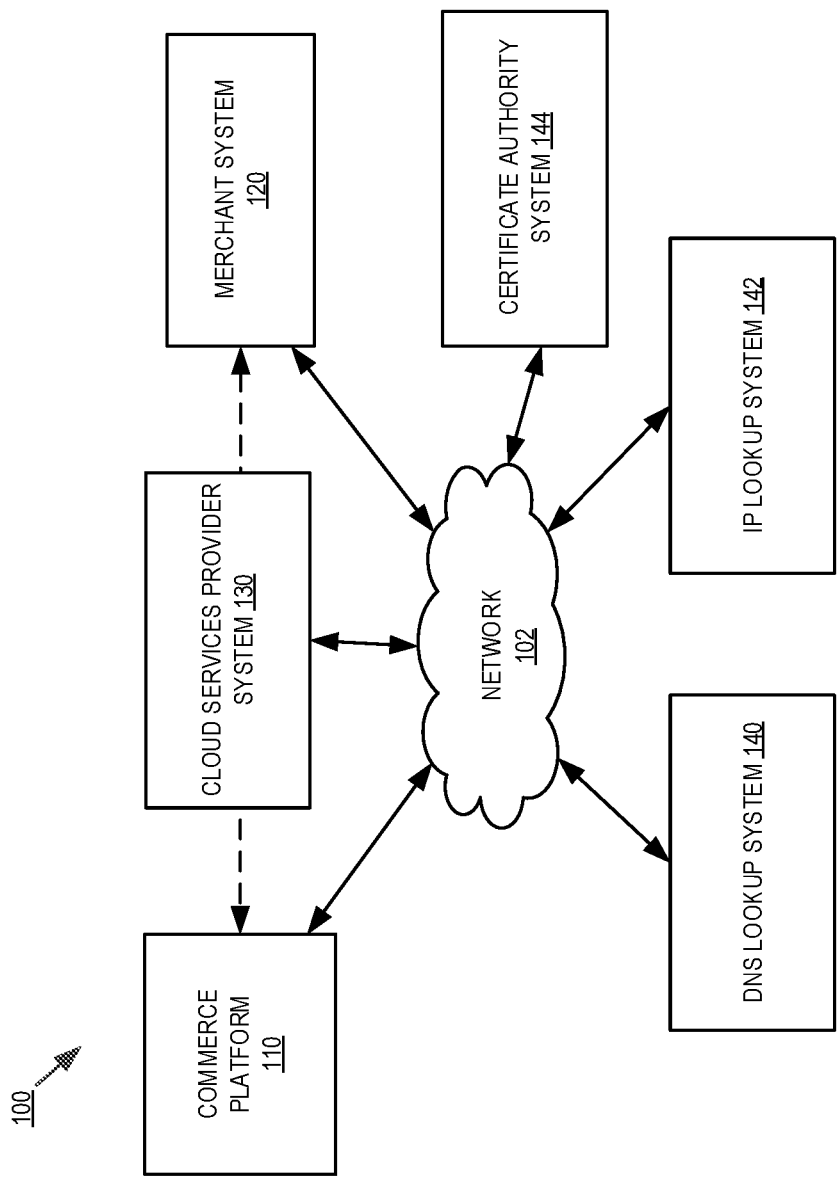
FIG. 1 is a block diagram of an exemplary system architecture for a commerce platform performing multi-factor authentication of a merchant system.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "authenticating", "receiving", "determining", "performing", "blocking", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for a commerce platform 110 performing multi-factor authentication of a merchant system 120. In embodiments, the multi-factor authentication can include the commerce platform 110 leveraging the services of the cloud services provider system 130.

In one embodiment, the system 100 includes one or more user computer systems, such as the merchant system 120, the commerce platform 110, and the cloud services provider system 130, as well as third party authentication systems (e.g., domain name system (DNS) lookup system 140, internet protocol (IP) address lookup system 142, and certificate authority system 144). The computer systems illustrated in FIG. 1 may also be computing devices, such as one or more server computer systems, desktop computer systems, etc.

The merchant system 120, commerce platform 110, cloud services provider system 130, DNS lookup system 140, IP lookup system 142, and certificate authority system 144 may be coupled to a network 102 and communicate with one another using any of the standard protocols for the exchange of information. In one embodiment, one or more of the merchant system 120, commerce platform 110, cloud services provider system 130, DNS lookup system 140, IP lookup system 142, and certificate authority system 144 may run on one Local Area Network (LAN) and may be incorporated into the same physical or logical system, or different physical or logical systems. Alternatively, the merchant system 120, commerce platform 110, cloud services provider system 130, DNS lookup system 140, IP lookup system 142, and certificate authority system 144 may reside on different LANs, wide area networks, cellular telephone networks, etc. that may be coupled together via the Internet but separated by firewalls, routers, and/or other network devices. In one embodiment, commerce platform 110 and merchant system 120 may each reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, merchant system 120 is responsible providing a system through which services and/or products are provided to consumers (e.g., the customers of the merchant, not shown). The merchant system 120 may, for example, provide a system through which laundry service, food delivery, transportation, personal service, etc. may be supplied to a consumer. Such services and/or products can be provided to the consumer via a merchant website provided through merchant system 120, a mobile application developed or distributed by the merchant system 120 that enables a consumer to order merchant products and/or services, as well as other forms of providing products and services of the merchant system 120. In one embodiment, merchant system 120 only provides the system through which the service and/or products are provided, and utilizes agents to actually provide the service and/or product.

In one embodiment, merchant system 120 does not handle financial transactions for the product and/or services which are provided by the merchant system 120 or agents of merchant. That is, when a product or service of the merchant system 120 is provided to a consumer by an agent/user, merchant website, or merchant application, the merchant system 120 does not receive consumer payment information (e.g., credit card information, digital asset information, etc.), process payments from accounts associated with the payment information, credit the merchant upon successful payment collection, credit the agent/user upon successful payment collection, etc. Instead, merchant system 120 utilizes the services of commerce platform 110 to perform the financial transactions and/or processing when a merchant system 120 service and/or product is provided to a merchant system's 120 customer.

In one embodiment, commerce platform 110 is a distributed commerce platform that is responsible for maintaining one or more accounts for merchant system 120, such as accounts that associate merchant system 120 with banking systems, identify service terms between the merchant system 120 and the commerce platform 110, identify how to credit agents of merchant system 120, identify a fee associated with each transaction processed by commerce platform 110, etc. Commerce platform 110, in embodiments, further maintains financial accounts for the agents/users of merchant system 120.

In embodiments, the merchant accounts maintained by the commerce platform 110 are associated with one or more encryption keys, referred to herein as application programming interface (API) keys. In embodiments, the API keys are keys generated by commerce platform 110, and then stored with an association to the merchant system 120 accounts. Public keys (e.g., from public key/private key pairs), symmetric encryption keys, or other forms of encryption key, may then be distributed to merchant system 120 for use when merchant system seeks to access merchant accounts, change merchant account configurations, run transactions, transfer money, or any other commerce platform provided service requiring authentication of the merchant system 120. In embodiments, commerce platform 110 application programming interface(s) (APIs), software libraries, etc. that are executed/used by merchant system 120 to access and use the services of the commerce platform utilize the API keys to identify and authenticate the merchant system 120 to the commerce platform 110. That is, the merchant system 120 uses the received API keys, which are associated with merchant system 120 accounts, to encrypt data within requests, messages, transaction parameters, configuration parameters, login credentials, etc. Then, the merchant's identity is used to access the corresponding keys maintained at the commerce platform 110, decrypt the requests, messages, data, etc., thereby verifying the identity of the merchant system 120. As discussed herein, each of these may be referred to as an authentication request since commerce platform 110 performs one or more authentications prior to responding to the request, carrying out the transaction, changing the configuration, etc.

Commerce platform 110, responsive to receipt of the merchant system's 120 authentication request, accesses the corresponding key associated by the commerce platform 110 with the merchant system 120 making the request. In embodiments, one or more merchant system identifiers are included in the request, which enable commerce platform 110 to access the corresponding keys. When the commerce platform 110 is able to successfully authenticate the request, such as by decrypting the relevant portions of the authentication request that enable commerce platform to verify a merchant system 120 identity, configuration parameters, transaction parameters, account settings, etc., the commerce platform 110 will perform the action in the received authentication request.

In embodiments, commerce platform 110 is aware that the merchant system's 120 API key(s) may be compromised, such as by access by a nefarious third party, distribution or use of party associated with the merchant system 120 not having permission to make such a distribution, or other scenarios in which an unauthorized party gains access to the API key(s) of merchant system 120. In embodiments, the unauthorized party may be able to run transactions, such as redirecting money transfers to their accounts, changing merchant configurations, etc., to the detriment of merchant system 120. Therefore, performing additional forms of authentication of the merchant system 120 may be desirable prior executing transaction.

In embodiments, commerce platform 110 therefore performs a multi-factor authentication of merchant system 120 before commerce platform 110 will perform the requested merchant action. In one embodiment, commerce platform 110 and merchant system 120 may both virtual computing systems, instances of a commerce platform 110 and a merchant system 120, etc., that may be executed using the computing system hardware and other resources of cloud services provider system 130. For example, cloud services provider system 130 may provide data centers, processors, memory, and private networks (e.g., a communication network within the cloud service provider system 130 in which messages are only routed between systems authenticated to and executing within the private network, and not exposed to communications originating from a public network, such as network 102). In this embodiment, commerce platform 110 and merchant system 120 each authenticate themselves to cloud services provider system 130, such as by providing valid login credentials maintained by the cloud services provider system 130. Then, instances of the commerce platform 110 and the merchant system 120 are initialized and configured to run within the computing environment of the cloud services provider system 130, including for example establishing respective private network IP addresses, registering as endpoints to receive/send communications within the private network, granting permissions to communicate within one another in the private network of the cloud services provider system 130, as well as other actions for establishing a connection with and using the services of the cloud services provider system 130. In embodiments, the commerce platform 110 and the merchant system 120 instances within the cloud services provider system 130 may then communicate within one another within the private network provided by the cloud services provider system 130 using their respective private network IP addresses. Such communications over the private network provided by the cloud services provider system 130 can include the above described merchant authentication requests (e.g., merchant system 120 messages/requests to access or configure the services provided by the commerce platform 110 to the merchant system 120).

In an embodiment, commerce platform 110 leverages the authentication process performed by the cloud services provider system 130 as an authentication factor for the merchant system 120. That is, cloud services provider system 130 performs an authentication process on the merchant system 120 when merchant system seeks to access and instantiate instances of the merchant system 120 within the cloud computing environment provided by the cloud services provider system 130. Thus, when an authentication request including an API key is received by the commerce platform 110 from the merchant system 120 over a private communications network connection, and the API key is verified by the commerce platform 110 as belonging the merchant system 120 making the request, then commerce platform 110 has a multi-factor authentication of the merchant system 120 and performs the requested action (e.g., configures a merchant account, runs a transaction, transfers money, etc.). That is, the commerce platform 110 can perform an explicit authentication using a received API key and can perform an implicit authentication based on the request originating from within the private network of the cloud services provider system 130. In embodiments, this type of multi-factor authentication used by the commerce platform 110 leveraging the services (e.g., private network based communications) of the cloud services provider system 130 enables commerce platform 110 to provide an independent and thus reliable form of multi-factor authentication. Furthermore, the multi-factor authentication improves the speed and efficiency of performing multi-factor authentications of the merchant system 120 requests using API keys, as traditional forms of multi-factor authentication (e.g., SMS code distribution, email code distribution, etc.) typically are associated with addition communications and time associated with such methods. Thus, commerce platform 110 is able to improve the speed by which it provides services, responds to merchant system 120 requests, etc., while at the same time providing strong multi-factor authentication.

In embodiments, where merchant system 120 does not use the services of a cloud services provider system 130, or where commerce platform 110 provides one or more additional forms of authentication (e.g., three-factor, four-factor, etc. authentication), commerce platform 110 responsive to receiving a merchant authentication request, queries one or more of DNS lookup system 140, IP lookup system 142, and/or certificate authority system 144 to verify the identity of a merchant system 120 making the request. In embodiments, as part of merchant system 120 registering with commerce platform 110, as discussed above, merchant system 120 and/or commerce platform 110 may establish domain names, IP addresses, certificates, etc. associated with the merchant system 120 that are authorized to perform one or more of the authentication request based operations (e.g., financial transaction, account configuration, money transfer, etc. utilizing an API key as an authentication factor). Then, during an authentication request received from merchant system 120, commerce platform 110 queries one or more of the DNS lookup system 140 to determine an owner of a domain name from which an authentication request was received, an IP lookup system 142 to match a dynamic IP address with a range of IP addresses to an owner of that range of IP addresses, and/or certificate authority system 144 to determine a validity of a certificate provided with the authentication request, as well as a combination of third party authentications. Then, when the domain name, IP address, and/or certificate can be verified (e.g., match those previously authorized by the merchant system 120 and/or dynamically verified as belong to the merchant associated with merchant system 120), commerce platform 110 again is able to provide an additional factor of merchant system 120 authentication, as an alternative or in addition to use of a private network of cloud services provider system 130. Such additional identity authentications enable commerce platform 110 to further improve the strength of the authentication being performed, such as providing additional forms of merchant system 120 authentication, and/or provide fallback forms of multi-factor authentication in the event one of the factors cannot be verified.

Figure 2:
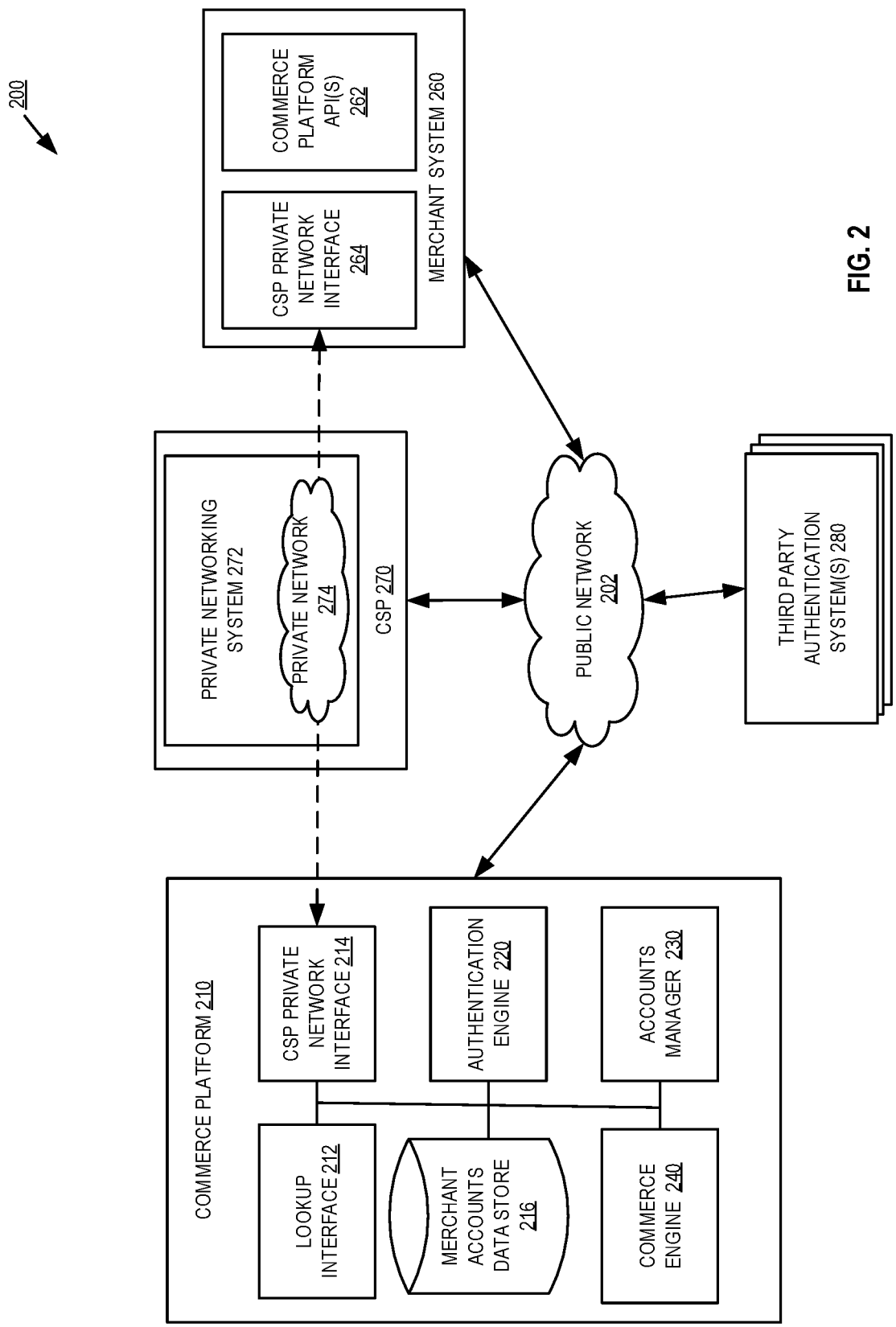
FIG. 2 is a block diagram of one embodiment of a commerce platform that authenticates a merchant system using at least two forms of authentication.

FIG. 2 is a block diagram of one embodiment 200 of a commerce platform 210 that authenticates a merchant system 260 using at least two forms of authentication. Commerce platform 210 may utilize the services of a cloud services provider (CSP) 270 and/or third party authentication system(s) 280. Commerce platform 210, CSP 270, merchant system 260 and third party authentication system(s) 280 provide additional details for the corresponding devices/systems discussed above in FIG. 1.

In one embodiment, commerce platform 210 includes CSP private network interface 212, authentication engine 220, accounts manager 230, commerce engine 240, lookup interface 212, and merchant accounts data store 216. Merchant system 260 includes a CSP private network interface 264 and commerce platform API(s) 262. Furthermore, CSP 270 includes a private networking system 272 that provides a private communications network 274. As discussed above, merchant system 260 will establish an account with commerce platform 210 to enable the merchant system 260 to perform financial transactions with customers (not shown) of the merchant system 260. The account information, such as login credentials, public and private API keys generated by the commerce platform 210 and distributed to the merchant system 260, bank account information, account settings, transaction settings, as well as other account information is maintained by accounts manager 230 within merchant accounts data store 216. This information may initially be set by a series of communication exchanged between commerce platform 210 and merchant system 260 over public network 202 during a merchant registration process.

After the establishment of the merchant system's 260 account, the merchant system 260 may then seek to perform transactions, change account settings, transfer money, etc. using the commerce platform 210. In one embodiment, as discussed herein, commerce platform 210 and merchant system 260 may be virtual computing device, instances of a merchant system 260 and a commerce platform 210, etc. executed using the resources of the CSP 270. Such a CSP 270 may be, for example, AMAZON WEB SERVICES™, GOOGLE CLOUD™, AZUL™, etc., that provides physical and logical computing resources for executing one or more of the components of the commerce platform 210 and merchant system 260, as well as functions and logic (e.g., CSP private network interfaces 214 and 264) for authenticating into, registering with, obtaining a private network address (e.g., private network IP address), as well as other functions enabling commerce platform 210 to communicate with merchant system 260 over private network 274 operated by the private network system 272 of CSP 270.

When commerce platform API(s) 262 generates an authentication requests (e.g., a message, request, transaction, etc. utilizing an API key of the merchant system 260 to authenticate the request), the authentication request is sent to commerce platform over the private network 274. Authentication engine 220 leverages the origin of the request as a first factor of authentication of the merchant system 260, and then verifies the API key in the received authentication request. For example, based on the purported identity of the merchant system 260, authentication engine 220 may access the private API key(s) within merchant accounts data store 216 associated with the merchant system 260 and seek to decrypt the data within the request using the accessed key(s). If successful, such as successfully decrypting a token, authorization information, request parameters, etc., authentication engine 220 obtains an additional factor of authentication of the merchant system 260. Then, based on the determined origin of the request originating from within the private networking system 272 and the verification of the merchant system's 260 API key, authentication engine 220 will authenticate the merchant system 260 as being associated with the merchant, and the request, configuration, transaction in the authentication request can be executed, for example by commerce engine 240 (e.g., running a transaction for a customer on behalf of merchant system 260, transferring money, etc.) and/or accounts manager 230 (e.g., updating accounts setting including bank accounts, routing numbers, allowable transaction parameters, etc.).

Furthermore, as discussed herein, when merchant system 260 forwards the authentication request to commerce platform 210 via public network 202, and/or via private network 274 but when one or more additional factors of authentication are desirable (e.g., based on a type of authentication request, dollar amount associated with the authentication request, type of account configuration change associated with the authentication request, etc.), lookup interface 212 may generate one or more queries to third party authentication system(s) 280 to perform additional form(s) of merchant system 260 authentication. As discussed herein, the requests may include, for example, dynamically looking up an owner of a domain name from which a request originated (e.g., did the request originate from "commerce.merchant.com" owned by merchant system 260 or from "hacker.spoof.ru" owned by an unknown party), looking up an IP address from which the request originated (e.g., is the IP address associated with IP addresses or a range of IP addresses associated with merchant system 260), verification of a certificate included in a request (e.g., can a third party certificate authority system verify a cryptographic certificate as belonging to merchant system 260), as well a combination of these authentications. Then, for example, authentication engine 220 determines whether a DNS lookup returns a domain associated with the merchant system 260, an IP address previously whitelisted by the merchant system 260, includes a valid certificate verified by a certificate authority, etc. to complete the additional form of authentication.

As discussed herein, the private network based multi-factor authentication enables commerce platform 210 to perform a secure and independent multi-factor authentication of merchant system 260, with improved efficiency over other forms of multi-factor authentication. Thus, transaction times are improved for the transactions, requests, configurations executed by commerce platform 210 on behalf of merchant system 260. Additionally, further forms of authentication may be utilized when stronger authentication of the merchant system 260 is desirable, as discussed above, or as an alternative when the authentication leveraging the private networking system 270 of the CSP 270 is unavailable.

Figure 3:
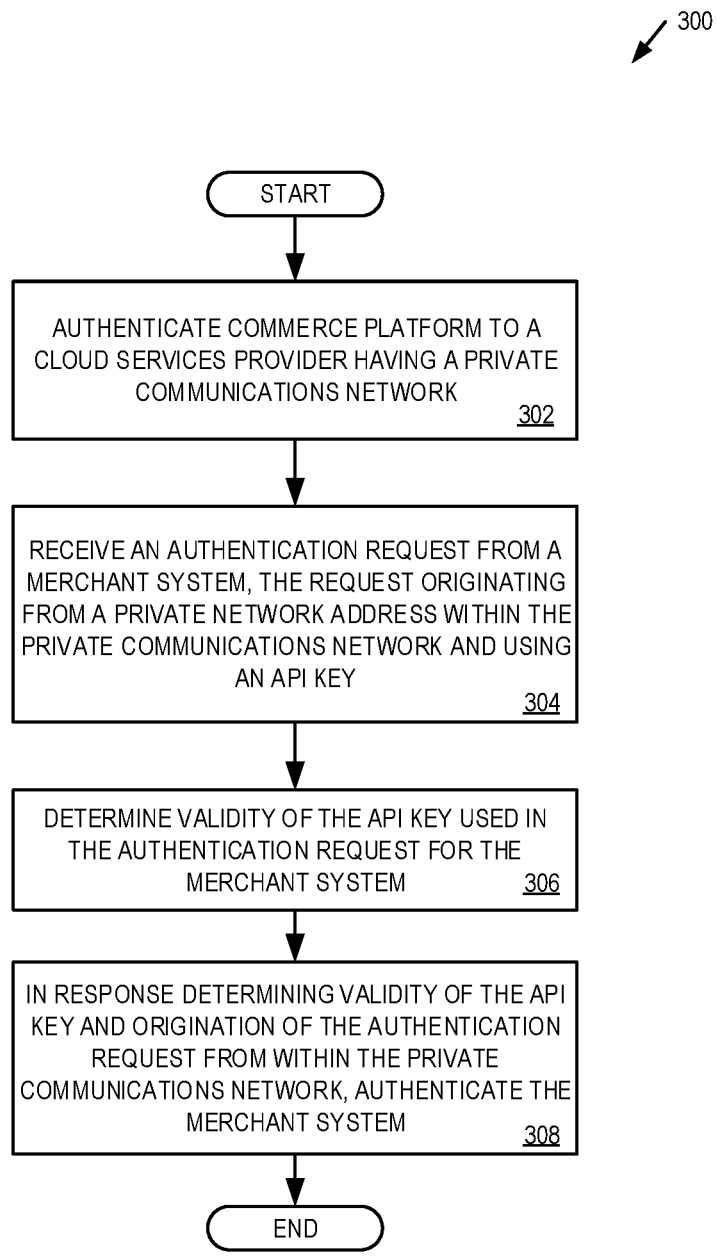
FIG. 3 is a flow diagram of one embodiment of a method for performing multi-factor authentication of a merchant system by a commerce platform.

FIG. 3 is a flow diagram of one embodiment of a method 300 for performing multi-factor authentication of a merchant system by a commerce platform. The method 300 is performed by processing logic that may comprise hardware (circuitry, dedicated logic, etc.), software (such as is run on a general purpose computer system or a dedicated machine), firmware, or a combination. In one embodiment, the method 300 is performed by a commerce platform (e.g., commerce platform 110 or 210).

Referring to FIG. 3, processing logic begins by authenticating the commerce platform to a cloud services provider having a private communications network (processing block 302). As discussed herein, the cloud services provider provides a cloud computing environment including hardware and software resource for use by the commerce platform and/or the merchant system. One of the resources, as discussed herein, is a private communications network in which only parties that have been authenticated by the cloud services provider, established themselves as endpoints within the private network including obtaining a network address within the private network (e.g., a private IP address), advertised and/or accepted connections with services executing within the cloud computing environment (e.g., instances of the commerce platform and merchant system run by the cloud services provider), etc. can exchange communications with other parties authenticated into the private network. In an embodiment, the commerce platform may authenticate itself to the cloud services provider by supplying appropriate login credentials, such as login/password combination, performing a multi-factor authentication, etc. Then, origination of an authentication request from within the private communications network may be based on receipt of a private IP address from the merchant system, performance of a cloud services provider system private network handshake process to establish a private network based communications session, etc.

Processing logic then receives an authentication request from the merchant system, where the request originates from a private network address within the private communications network and using an API key (processing block 304). As discussed above, the authentication request may be a transaction request, account configuration request, money transfer request, or any other request in which the merchant's API key is used to authenticate the party making the request (e.g., a purported user of the merchant with permission to make such a request). Because such requests involve sensitive customer information, sensitive merchant information, may seek to change important and/or financial settings of a merchant's account, may seek to transfer money, etc., processing logic determines validity of the API key used in the authentication request for the merchant system (processing block 306). In embodiments, based on the purported identity of the merchant system making the request, processing logic accesses corresponding keys maintained by the commerce platform to decrypt the request, decrypt data within the request, etc. When such decryption is successful, indicating that the received API key has a corresponding/matching encryption key at the commerce platform, processing logic has performed a factor in the multi-factor authentication of the merchant system.

Processing logic, in response to determining validity of the API key and origination of the authentication request from within the private communications network, authenticates the merchant system (processing block 308). That is, the verification of the API key and the origination of the authentication request from within the private network each provide a form of authentication, and the occurrence of both therefore results in multi-factor authentication of the merchant system by processing logic of the commerce platform. In embodiments, the authentication enables the commerce platform to perform the requested action associated with the authentication request (e.g., carry out the transfer of money, change a merchant account setting, run a financial transaction, etc.).

In one embodiment, the authentication request received at processing block 302 may be part of a request to/from a private network communication link and/or session. That is, the receipt and verification of the API key from the merchant system is performed during the setup of a private communications network connection between the commerce platform and the merchant system. Then, additional requests (e.g., transactions, configurations, transfers, etc.) may be received and executed within the private network and utilizing an API key. That is, upon successful multi-factor authentication, the identity of the merchant system is verified. In embodiments, this verification status is maintained by processing logic for a limited time (e.g., a time period, a number of transactions, etc.) such that later transactions do not perform multi-factor authentication with each request. Then, after a time period of the verification status has elapsed, processing logic would then require a new multi-factor authentication of the merchant system. Furthermore, there may be certain requests that require a multi-factor authentication verification to be performed by processing logic to complete the individual request, such as for example, transactions over a certain amount, money transfers over a certain amount, changing banking information, etc.

In any embodiment, processing logic's utilization/verification of a received API key, while leveraging of the cloud services provider's authentication of the merchant system, enables processing logic to perform a more efficient, and yet secure and independently verified multi-factor authentication of the merchant system.

Figure 4:
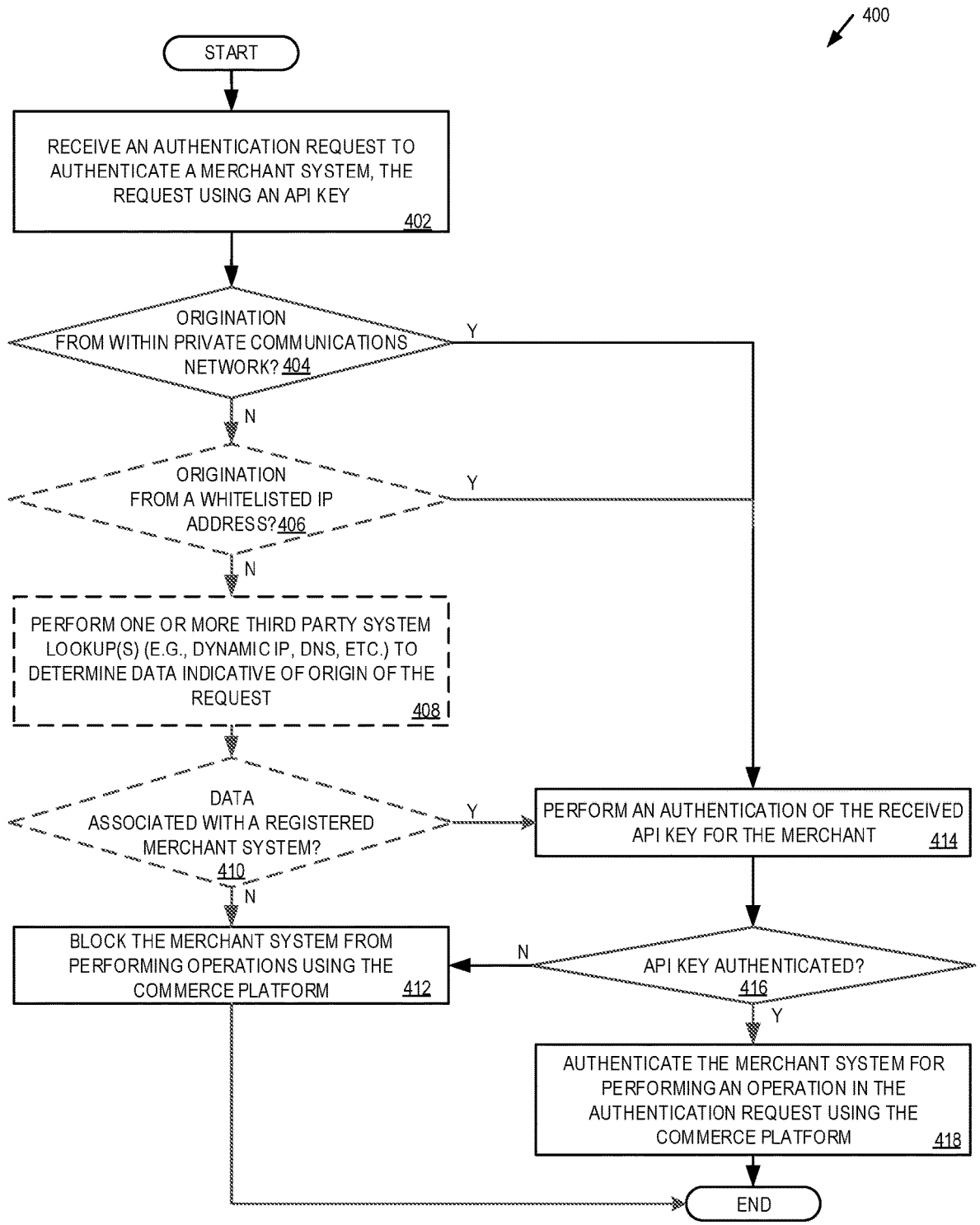
FIG. 4 is a flow diagram of another embodiment of a method for performing multi-factor authentication of a merchant system by a commerce platform.

FIG. 4 is a flow diagram of another embodiment of a method 400 for performing multi-factor authentication of a merchant system by a commerce platform. The method 400 is performed by processing logic that may comprise hardware (circuitry, dedicated logic, etc.), software (such as is run on a general purpose computer system or a dedicated machine), firmware, or a combination. In one embodiment, the method 400 is performed by a commerce platform (e.g., commerce platform 110 or 210).

Referring to FIG. 4, processing logic begins by receiving an authentication request to authenticate a merchant system, where the request uses an API key (processing block 402). Processing logic then determines whether the authentication request originates from within a private communications network (processing block 404). In embodiments, processing logic may utilize a previously established communication session, a determination that an IP address of the merchant system making the request is a private network IP address, etc. to determine the origination of the authentication request.

When originating from within the private communications network of a cloud services provider, processing logic then performs an authentication of the received API key for the merchant (processing block 414). When the API key can be authenticated (processing block 416), the merchant is authenticated for performing an operation in the authentication request using the commerce platform (processing block 418).

Returning to processing block 404, when processing logic cannot determine that the authentication request originated from within the private communications network (processing block 404), processing logic then verifies whether the request originated from a whitelisted IP address (processing block 406). As discussed herein, processing logic may consult a merchant accounts data store to determine whether the IP address from which the authorization request originated from matches a preauthorized IP address. When it does, the process can proceed to processing block 414 for API key verification, as discussed above.

If the IP address is not associated with a whitelisted IP address (processing block 404), processing logic may perform one or more third party system lookup(s) (e.g., dynamic IP, DNS, or other lookup, certificate verification, etc.) to determine data indicative of an origin of the authentication request (processing block 408). When the obtained data is associated with a registered merchant system (e.g., a merchant system that previously registered with the commerce platform and provided data matching the data obtained at processing block 408 during registration and/or account configuration process(es)), processing logic again proceeds to processing block 414 for API key verification, as discussed above.

When an API key cannot be verified (processing block 416) or when origination information of the authentication request cannot be verified (processing block 404-410), processing logic blocks the merchant system from performing operations using the commerce platform (processing block 412). In embodiments, merchant system having failed the multi-factor authentication, is prohibited from performing the requested transaction, account configuration, money transfer, etc., so that the merchant account is safeguarded against intentional and unintentional behavior that may harm the merchant and their customers.

Although processing block 406-410 are illustrated as being performed when an authentication request does not originate from within a private communications network, in embodiments, the additional types of identity authentication may be performed to supplement private network verification. For example, certain types of transactions (e.g., over a predefined dollar amount), certain requests to change account configurations (e.g., requests to change financial information such as bank account numbers, routing numbers, etc.), a well as other types of operations impacting a merchant's account at commerce platform may trigger the verification of additional authentication factors.

Figure 5:
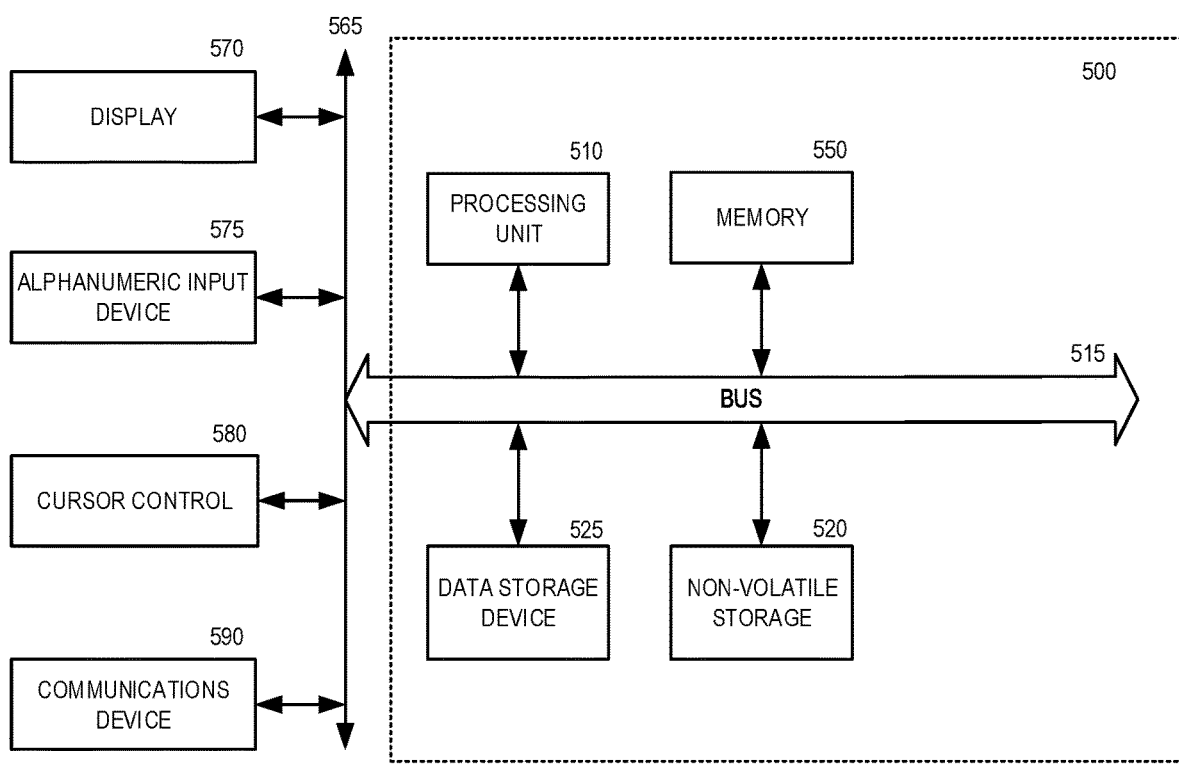
FIG. 5 is one embodiment of a computer system that may be used to support the systems and operations discussed herein.

FIG. 5 is one embodiment of a computer system that may be used to support the systems and operations discussed herein. It will be apparent to those of ordinary skill in the art, however that other alternative systems of various system architectures may also be used.

The data processing system illustrated in FIG. 5 includes a bus or other internal communication means 515 for communicating information, and a processor 510 coupled to the bus 515 for processing information. The system further comprises a random access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The embodiments discussed herein may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method for performing multi-factor authentication of a merchant system by a commerce platform, the method comprising:
   authenticating the commerce platform to a cloud services provider, the cloud services provider providing a private communications network for use by the commerce platform and the merchant system;
   receiving, by the commerce platform, an authentication request from the merchant system, wherein the authentication request received from the merchant system originates from the private communications network provided by the cloud services provider, and wherein the authentication request uses an encryption key, wherein the encryption key is an application programming interface (API) key generated by the commerce platform;
   determining, by the commerce platform, validity of the encryption key used in the authentication request for the merchant system;
   performing a multi-factor authentication of the merchant system based on: (1) a first determination that the authentication request occurs from within the private communications network and originated from a device having a device address of the private communications network, and (2) a second determination of the validity of the encryption key; and
   in response to performing the multi-factor authentication of the merchant system and verifying an identity of the merchant system, authenticating the merchant system as an authorized system for performing an operation requested by the authentication request using the commerce platform.

2. The method of claim 1, wherein the authentication request uses the encryption key further comprises at least a portion of the authentication request being encrypted by the merchant system using the encryption key, and determining the validity of the encryption key further comprises:
   accessing, in a merchant system data store, a second encryption key associated by the commerce platform with the merchant system;
   attempting to decrypt the at least a portion of the authentication request; and
   verifying an identity of the merchant system in response to successful decryption of the at least the portion of the authentication request using the second encryption key associated with the merchant system.

3. The method of claim 2, wherein the encryption key and the second encryption key are complementary encryption keys generated by the commerce platform during a registration process performed between the merchant system and the commerce platform, and wherein the encryption key is transmitted from the commerce platform to the merchant system during the registration.

4. The method of claim 1, further comprising:
   determining, by the commerce platform, that the request received from the merchant system originated from the private communications network by detecting that the request was issued from a device having a private communications network internet protocol (IP) network address.

5. The method of claim 1, further comprising:
   determining, by the commerce platform, that the request received from the merchant system originated from the private communications network by establishing a private communications network based communications session with the merchant system prior to receipt of the authentication request.

6. The method of claim 1, wherein the authentication request comprises a message communicated from the merchant system to the commerce platform and includes a request to perform the operation utilizing the services of the commerce platform, the operation comprising a financial transaction with a customer of the merchant on behalf of the merchant, an account configuration operation associated with a merchant account maintained by the commerce platform, or a money transfer operation that is to transfer money out of a merchant account maintained by the commerce platform for the merchant system.

7. The method of claim 1, further comprising:
   detecting when the requested operation in the authentication request includes a trigger for verification of an additional authentication factor, wherein the trigger comprises a dollar amount of the requested operation exceeding a threshold dollar amount, a request to change a bank account or routing number in a merchant account, a request to transfer money out of a merchant account maintained by the commerce platform, or a combination thereof; and
   performing an additional form of verification of an identity of the merchant system.

8. The method of claim 7, wherein performing the additional form of verification of the identity of the merchant system comprises:
   determining, by the commerce platform, an internet protocol (IP) address of the merchant system from which the authorization request originated, wherein the IP address is a public network IP address;
   accessing, by the commerce platform in a merchant system data store, a set of whitelisted IP addresses associated with the merchant system, wherein each whitelisted IP address is predefined as being associated with an authorized merchant system;
   verifying the identity of the merchant system in response to matching the IP address with one a whitelisted IP address in the set of whitelisted IP addresses, wherein the verification of the identity of the merchant system comprises the additional authentication factor.

9. The method of claim 7, wherein performing the additional form of verification of the identity of the merchant system comprises:
   obtaining, by the commerce platform from a domain name service lookup services, ownership information associated with a domain name from which the authentication request was received;
   determining whether the ownership information is indicative of the merchant system owning the domain name from which the authentication request originated; and
   verifying the identity of the merchant system in response to determining that the merchant system owns the domain name, wherein the verification of the identity of the merchant system comprises an additional authentication factor.

10. A non-transitory computer readable storage medium including instructions that, when executed by a processor, cause the processor to perform operations for performing multi-factor authentication of a merchant system by a commerce platform, the operations comprising:
    authenticating the commerce platform to a cloud services provider, the cloud services provider providing a private communications network for use by the commerce platform and the merchant system;

receiving, by the commerce platform, an authentication request from the merchant system, wherein the authentication request received from the merchant system originates from the private communications network provided by the cloud services provider, and wherein the authentication request uses an encryption key, wherein the encryption key is an application programming interface (API) key generated by the commerce platform;

determining, by the commerce platform, validity of the encryption key used in the authentication request for the merchant system;

performing a multi-factor authentication of the merchant system based on: (1) a first determination that the authentication request occurs from within the private communications network and originated from a device having a device address of the private communications network, and (2) a second determination of the validity of the encryption key; and in response to performing the multi-factor authentication of the merchant system and verifying an identity of the merchant system, authenticating the merchant system as an authorized system for performing an operation requested by the authentication request using the commerce platform.

11. The non-transitory computer readable storage medium of claim 10, wherein the authentication request uses the encryption key further comprises at least a portion of the authentication request being encrypted by the merchant system using the encryption key, and determining the validity of the encryption key further comprises:

accessing, in a merchant system data store, a second encryption key associated by the commerce platform with the merchant system;

attempting to decrypt the at least a portion of the authentication request; and verifying an identity of the merchant system in response to successful decryption of the at least the portion of the authentication request using the second encryption key associated with the merchant system.

12. The non-transitory computer readable storage medium of claim 11, wherein the encryption key and the second encryption key are complementary encryption keys generated by the commerce platform during a registration process performed between the merchant system and the commerce platform, and wherein the encryption key is transmitted from the commerce platform to the merchant system during the registration.

13. The non-transitory computer readable storage medium of claim 10, further comprising:

determining, by the commerce platform, that the request received from the merchant system originated from the private communications network by detecting that the request was issued from a device having a private communications network internet protocol (IP) network address.

14. The non-transitory computer readable storage medium of claim 10, further comprising:

determining, by the commerce platform, that the request received from the merchant system originated from the private communications network by establishing a private communications network based communications session with the merchant system prior to receipt of the authentication request.

15. The non-transitory computer readable storage medium of claim 10, wherein the authentication request comprises a message communicated from the merchant system to the commerce platform and includes a request to perform the operation utilizing the services of the commerce platform, the operation comprising a financial transaction with a customer of the merchant on behalf of the merchant, an account configuration operation associated with a merchant account maintained by the commerce platform, or a money transfer operation that is to transfer money out of a merchant account maintained by the commerce platform for the merchant system.

16. The non-transitory computer readable storage medium of claim 10, further comprising:

detecting when the requested operation in the authentication request includes a trigger for verification of an additional authentication factor, wherein the trigger comprises a dollar amount of the requested operation exceeding a threshold dollar amount, a request to change a bank account or routing number in a merchant account, a request to transfer money out of a merchant account maintained by the commerce platform, or a combination thereof; and performing an additional form of verification of an identity of the merchant system.

17. The non-transitory computer readable storage medium of claim 16, wherein performing the additional form of verification of the identity of the merchant system comprises:

determining, by the commerce platform, an internet protocol (IP) address of the merchant system from which the authorization request originated, wherein the IP address is a public network IP address;

accessing, by the commerce platform in a merchant system data store, a set of whitelisted IP addresses associated with the merchant system, wherein each whitelisted IP address is predefined as being associated with an authorized merchant system;

verifying the identity of the merchant system in response to matching the IP address with one a whitelisted IP address in the set of whitelisted IP addresses, wherein the verification of the identity of the merchant system comprises the additional authentication factor.

18. The non-transitory computer readable storage medium of claim 16, wherein performing the additional form of verification of the identity of the merchant system comprises:

obtaining, by the commerce platform from a domain name service lookup services, ownership information associated with a domain name from which the authentication request was received;

determining whether the ownership information is indicative of the merchant system owning the domain name from which the authentication request originated; and verifying the identity of the merchant system in response to determining that the merchant system owns the domain name, wherein the verification of the identity of the merchant system comprises an additional authentication factor.

19. A commerce platform that performs multi-factor authentication of a merchant system, the commerce platform comprising:

a memory storing one or more instructions; and a processor configured to execute the one or more instructions stored in the memory, which when executed by the processor cause the process to perform operations comprising:

authenticating the commerce platform to a cloud services provider, the cloud services provider providing a private communications network for use by the commerce platform and the merchant system, receiving, by the commerce platform, an authentication request from the merchant system, wherein the authentication request received from the merchant system originates from the private communications network provided by the cloud services provider, and wherein the authentication request uses an encryption key, wherein the encryption key is an application programming interface (API) key generated by the commerce platform, determining, by the commerce platform, validity of the encryption key used in the authentication request for the merchant system, performing a multi-factor authentication of the merchant system based on: (1) a first determination that the authentication request occurs from within the private communications network and originated from a device having a device address of the private communications network, and (2) a second determination of the validity of the encryption key, and in response to performing the multi-factor authentication of the merchant system and verifying an identity of the merchant system, authenticating the merchant system as an authorized system for performing an operation requested by the authentication request using the commerce platform.

20. The commerce platform of claim 19, wherein the authentication request uses the encryption key further comprises at least a portion of the authentication request being encrypted by the merchant system using the encryption key, and operations for determining the validity of the encryption key further comprise operations for:

accessing, in a merchant system data store, a second encryption key associated by the commerce platform with the merchant system;

attempting to decrypt the at least a portion of the authentication request; and verifying an identity of the merchant system in response to successful decryption of the at least the portion of the authentication request using the second encryption key associated with the merchant system.

\* \* \* \* \*